(12) United States Patent
Baker et al.

(10) Patent No.: US 7,903,561 B2
(45) Date of Patent: Mar. 8, 2011

(54) COMMUNICATION DEVICE, A METHOD OF OPERATING A COMMUNICATION DEVICE AND A COMMUNICATION SYSTEM

(75) Inventors: Matthew P. J. Baker, Canterbury (GB); Paul Bucknell, Brighton (GB)

(73) Assignee: NXP B.V., Eindhoven (NL)

( * ) Notice: Subject to any disclaimer, the term of this patent is extended or adjusted under 35 U.S.C. 154(b) by 821 days.

(21) Appl. No.: 11/814,563

(22) PCT Filed: Jan. 20, 2006

(86) PCT No.: PCT/IB2006/050218
§ 371 (c)(1),
(2), (4) Date: Jul. 27, 2007

(87) PCT Pub. No.: WO2006/077556
PCT Pub. Date: Jul. 27, 2006

(65) Prior Publication Data
US 2008/0186941 A1    Aug. 7, 2008

(30) Foreign Application Priority Data

Jan. 22, 2005   (GB) .................................. 0501403.0

(51) Int. Cl.
*H04J 1/16* (2006.01)
(52) U.S. Cl. ........................................ 370/235; 370/384

(58) Field of Classification Search .................. 370/311, 370/329, 341, 347, 349, 431, 310.2, 328, 370/338, 400
See application file for complete search history.

(56) References Cited

U.S. PATENT DOCUMENTS

| | | |
|---|---|---|
| 7,400,612 B2 * | 7/2008 | Yamaura ........................ 370/338 |
| 2003/0050084 A1 | 3/2003 | Damnjanovic et al. |
| 2004/0203991 A1 | 10/2004 | Chen et al. |
| 2004/0218533 A1 | 11/2004 | Kim et al. |
| 2005/0043051 A1 | 2/2005 | Takano et al. |

OTHER PUBLICATIONS

Burley et al., "Optimised Channel Rate Switching," Motorola, Inc. Aug. 24, 2004. 2 pages.

* cited by examiner

*Primary Examiner* — Brenda Pham
(74) *Attorney, Agent, or Firm* — Timothy L. Boller; Seed IP Law Group PLLC

(57) ABSTRACT

A mobile station (100) in a mobile communication system obeys commands received from a serving base station (300) to decrease its transmission rate, and obeys commands received from the serving base station (300) to increase its transmission rate except when a predetermined time period is in progress. It obeys commands received from a non-serving base station (200, 400) to decrease its transmission rate, it initiates the predetermined time period in response to receiving such commands, and it terminates the predetermined time period in response to a further command from the same non-serving base station (200, 400).

9 Claims, 5 Drawing Sheets

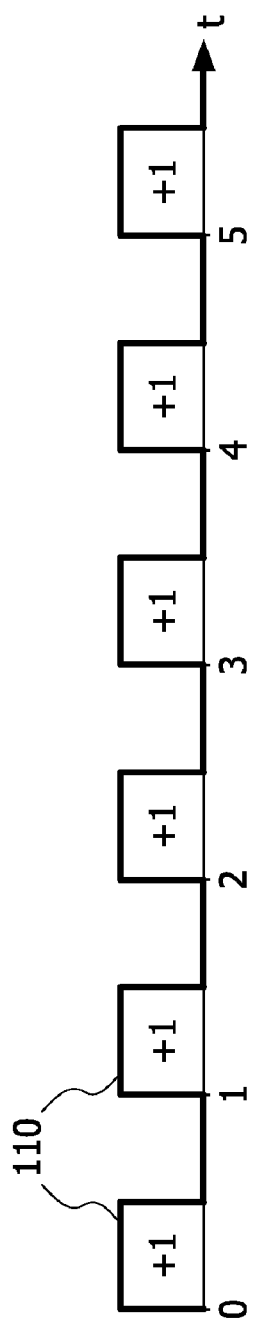
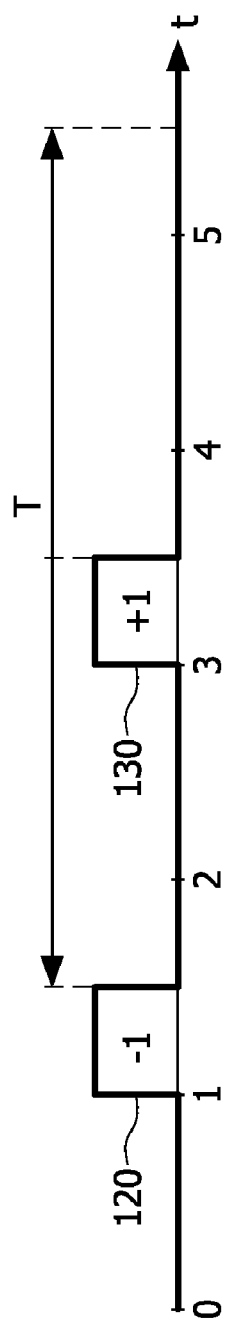
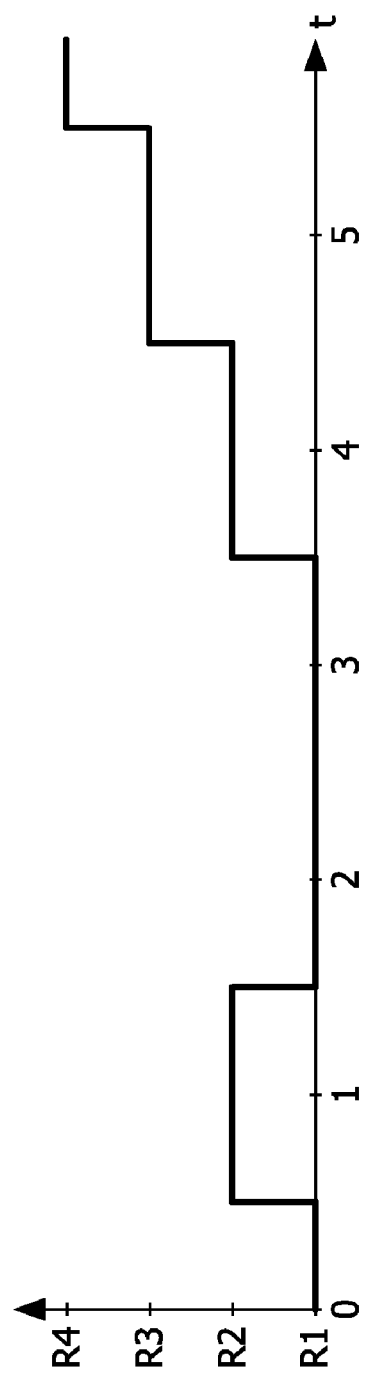

COMMUNICATION DEVICE, A METHOD OF OPERATING A COMMUNICATION DEVICE AND A COMMUNICATION SYSTEM

The invention relates to a communication device, to a method of operating a communication device, and to a communication system comprising a communication device. The invention has application in, particularly but not exclusively, mobile communication devices and systems such as the Universal Mobile Telecommunication System (UMTS).

According to current proposals for the UMTS Enhanced Uplink, "serving" and "non-serving" base stations (BSs) can adjust the transmission rate granted to a mobile station (MS) by transmitting the following commands to the MS. "−1" commands take precedence over other commands.

Serving BS: "Increase rate" (+1)
    "Decrease rate" (−1) or
    "Keep current rate" (DTX)
Non-serving BS: "Decrease rate" (−1) or
    "Don't care" (DTX)
where "DTX" represents no transmission.

By "serving" base station we mean a BS which is configured to receive transmissions from a particular MS and by "non-serving" base station we mean a BS which may receive transmissions from the MS but is not required to do so. Typically a serving BS has greater control than a non-serving BS over the transmission parameters used by the MS, resulting in typically more reliable reception of MS transmissions by serving BSs than by non-serving BSs. Typically each MS is associated with exactly one serving BS, and may simultaneously be associated with a plurality of non-serving BSs.

The non-serving BSs are not permitted to transmit the +1 signal, as only the serving BS has the authority to give a MS permission to increase its transmission rate.

One problem which can occur with this scheme is that the serving and non-serving BSs can cause the granted transmission rate to toggle between two values if a non-serving BS transmits −1, followed by DTX once the MS's transmitted rate is down to an acceptable level, while the serving BS can tolerate a higher rate, which requires a higher received power level, and transmits +1 continually. A further problem with this toggling is the frequent signalling from non-serving BSs, which wastes downlink (BS to MS) resources and causes more interference to other users.

One way to overcome the toggling is for all the non-serving BSs to transmit "−1" continually until the MS transmission rate is well below its acceptable level. However, this does not solve the problem of the large quantity of downlink signalling, and also results in a lower transmission rate from the MS than should in fact be possible.

It is also known to include a hysteresis period, such that the MS will ignore "+1" commands from the serving BS until the expiry of a predetermined time period after the most recent "−1" command was received from any of the non-serving BSs. Such a scheme is illustrated in FIG. 1. FIG. 1, graph (a) shows a sequence of "+1" commands 110 transmitted by a serving BS at intervals of one transmission time interval (TTI). Graph (c) shows the transmission rate being increased by the MS from rate R1 to rate R2 in response to the "+1" command transmitted at time t=0. Graph (b) shows a "−1" command 120 transmitted by a non-serving BS at time t=1, and in response to this in graph (c) the transmission rate is decreased. A hysteresis period T commences after the receipt of the "−1" command for a predetermined period of four TTIs, such that the next three "+1" commands from the serving BS are ignored. The length of the predetermined time period is a trade-off between reducing downlink signalling from the non-serving BSs, which implies using a long period, and maximising the possible transmission rate for the MS, which implies using a short period. Thus the use of a hysteresis period in this way will result in the granted rate for the MS being lower than necessary if the situation of the non-serving BSs changes before the end of the hysteresis period such that they can tolerate a higher transmission rate from the MS.

An object of the invention is to provide improved control of a transmission parameter.

According to a first aspect of the invention there is provided a method of operating a first communication device in a communication system comprising a plurality of stations, the method comprising:

in response to receiving a first command from a first station, decreasing a parameter value and commencing the timing of a first predetermined time period;

in response to receiving a second command from the first station, terminating the timing of the first predetermined time period if the timing is in progress;

in response to receiving a first command from a second station, decreasing the parameter value; and in response to receiving a second command from the second station, increasing the parameter value unless the timing of the first predetermined time period is in progress.

According to a second aspect of the invention there is provided a communication device comprising:

means for receiving commands from a plurality of stations;

adjustment means for adjusting a parameter value in response to the received commands; and timing means for timing one or more predetermined time periods; wherein in response to the receipt of a first command from a first station, the adjustment means is adapted to decrease the parameter value and the timing means is adapted to commence the timing of a first predetermined time period;

in response to the receipt of a second command from the first station, the timing means is adapted to terminate the timing of the first predetermined time period;

in response to the receipt of a first command from a second station, the adjustment means is adapted to decrease the parameter value; and in response to the receipt of a second command from the second station, the adjustment means is adapted to increase the parameter value unless the timing of the first predetermined time period by the timing means is in progress.

According to a third aspect of the invention there is provided a communication system comprising a communication device according to the second aspect of the invention.

The invention provides a way of enhancing the known transmission rate control scheme described above which uses a hysteresis period, by providing a way for terminating the hysteresis period prior to its expiry in response to a command from the same station that caused the initiation of the hysteresis period. The invention enables the toggling of the granted transmission rate to be avoided without requiring the non-serving BSs to send repeated "−1" commands, as well as enabling the non-serving BSs to terminate the hysteresis period to allow the serving BS to increase the rate, for example if the interference level of the non-serving BSs changes so they can tolerate a higher transmission rate from the MS. Other transmission parameters may be controlled using the invention, instead of or in addition to the transmission rate.

The invention will now be described, by way of example only, with reference to the accompanying drawings wherein:

FIG. 2 is a timing diagram illustrating a first example of the invention;

Figure 1A:
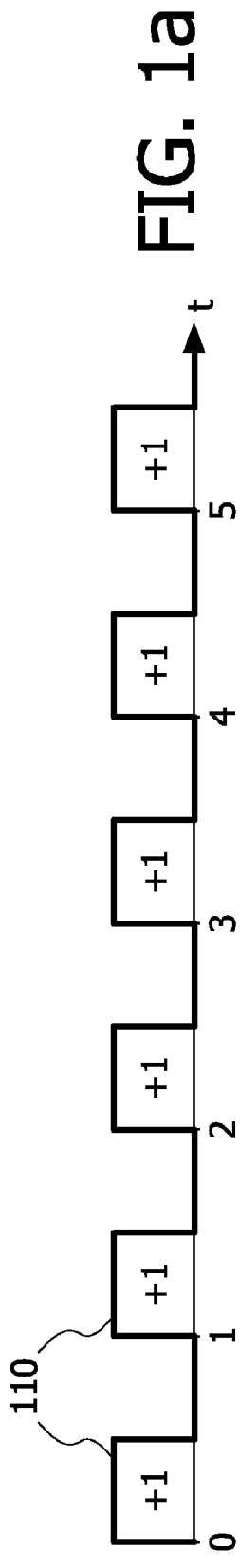
FIG. 1 is a timing diagram illustrating a prior art method.
Figure 1B:
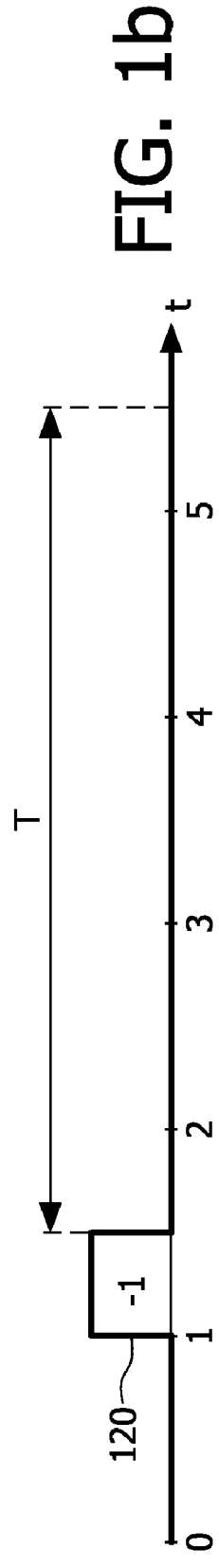
Figure 1C:
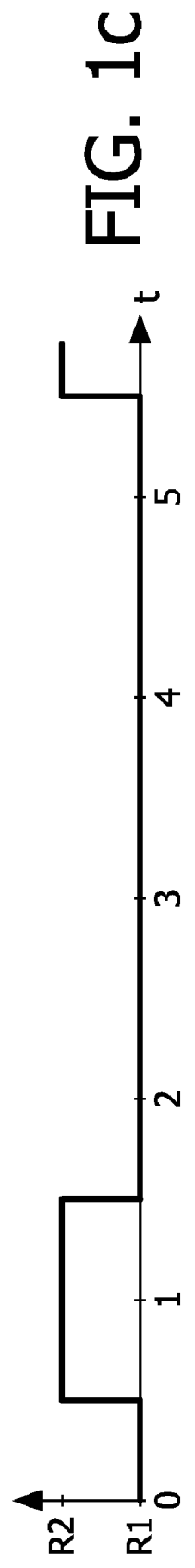
Figure 3A:
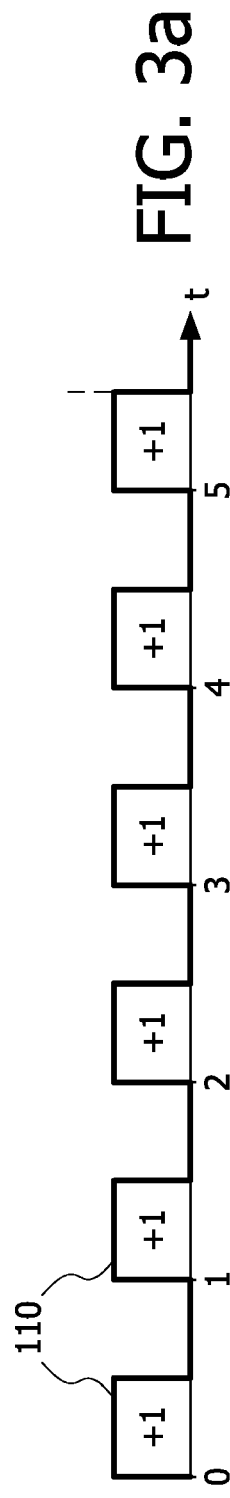
FIG. 3 is a timing diagram illustrating a second example of the invention.
Figure 3B:
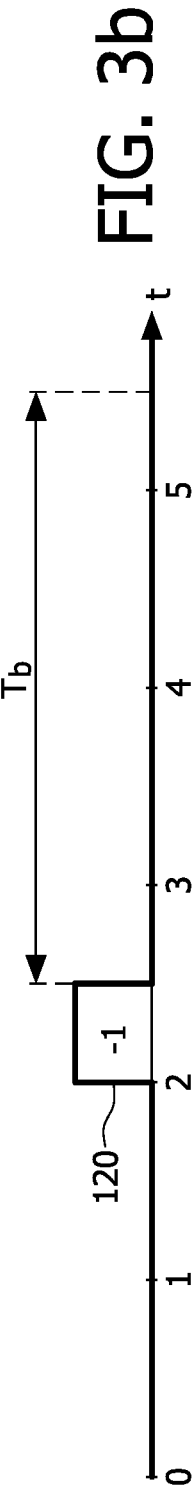
Figure 3C:
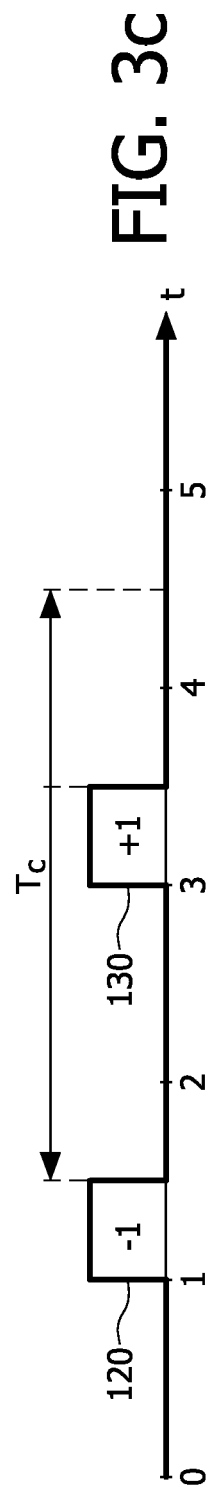
Figure 3D:
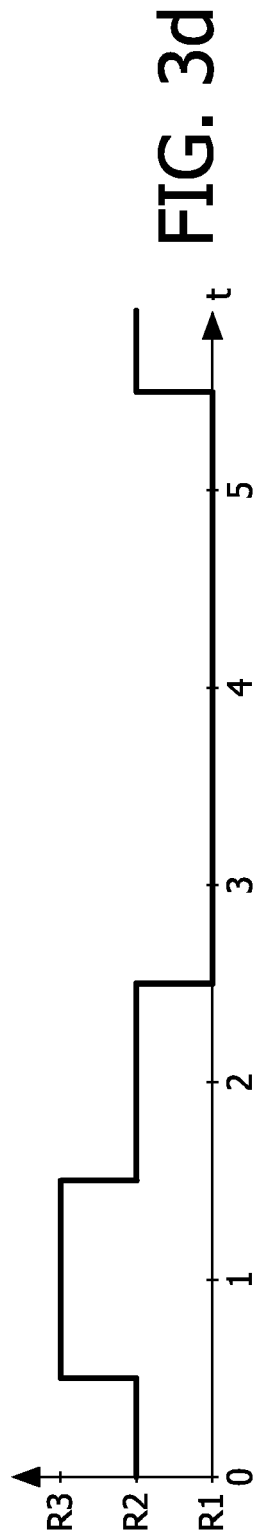

According to the invention, a command from a non-serving BS is defined to provide a way for a non-serving BS to terminate a hysteresis period that was initiated by a command that it transmitted. Conveniently, a "+1" command may serve this purpose, terminating a hysteresis period that was initiated by a "−1" command. An example of a set of commands transmitted by a non-serving base station, and their significance to a MS, is shown in Table 1.

TABLE 1

| Command | Significance outside hysteresis period | Significance within hysteresis period |
| --- | --- | --- |
| −1 | Decrease rate | Decrease rate |
| DTX | Don't care - can increase rate if permitted by serving BS | Keep current rate, unless commanded to decrease by serving BS |
| +1 | Not applicable | Don't care - can increase rate if permitted by serving BS |

The "+1" command is not applicable outside of a hysteresis period because such a command will not generally be transmitted by a non-serving bases station; if it were to be transmitted it would be ignored by the MS.

FIGS. 2 and 3 illustrate two examples of the operation of the invention. In both FIGS. 2 and 3, graph (a) shows "+1" commands 110 transmitted by a serving BS at intervals of time t corresponding to one Transmission Time Interval (TTI), which is the interval at which Protocol Data Units (PDUs) are transferred between the physical layer and the MAC layer of the protocol stack in UMTS. The time may alternatively be quantified in other units, such as radio frames, hybrid ARQ process periods, seconds, or timeslots.

In FIG. 2, graph (c) shows the transmission rate being increased by the MS from rate R1 to rate R2 in response to the "+1" command 110 transmitted by the serving BS at time t=0. Graph (b) shows a "−1" command 120 transmitted by a non-serving BS at time t=1, and in response to this in graph (c) the transmission rate is decreased from rate R2 to rate R1. A hysteresis period T commences after the receipt of the "−1" command for a predetermined period of four TTIs. The "+1" command transmitted by the serving BS at time t=2 is ignored, so the transmission rate is maintained at R1. At time t=3 the non-serving BS transmits a "+1" command 130, for example because interference at that non-serving BS reduces, which has the effect of terminating the hysteresis period, thus permitting the MS to increase the transmission rate in response to receiving the "+1" command transmitted by the serving BS at time t=3, and thereafter in response to the subsequent "+1" commands transmitted by the serving BS.

Note that a hysteresis period is not terminated by a command from a different non-serving station, i.e. a different non-serving station than the one that initiated the hysteresis period.

Hysteresis periods initiated by different non-serving base stations may overlap, and the MS ignores "+1" commands received while any hysteresis period is in progress. An example of this situation is illustrated in FIG. 3.

In FIG. 3, graph (d) shows the transmission rate being increased by the MS from rate R2 to rate R3 in response to the "+1" command 110 transmitted by the serving BS at time t=0. Graph (c) shows a "−1" command 120 transmitted by a first non-serving BS at time t=1, and in response to this in graph (d) the transmission rate is decreased from rate R3 to rate R2 and a first hysteresis period $T_c$ commences after the receipt of this "−1" command 120 for a predetermined period of three TTIs. The "+1" command transmitted by the serving BS at time t=2 is ignored because the hysteresis period $T_c$ is in progress.

Graph (b) of FIG. 3 shows at time t=2 a second non-serving BS transmitting a "−1" command 120 and the MS reduces the transmission rate from R2 to R1 in response to receiving this command and also commences a second hysteresis period $T_b$ for a predetermined period of three TTIs.

In graph (c) of FIG. 3, at time t=3 the first non-serving BS transmits a "+1" command 130, for example because interference at that non-serving BS reduces, which has the effect of terminating the first hysteresis period $T_c$, but not the second hysteresis period $T_b$. Because the second hysteresis period $T_b$ is still in progress, the MS does not increase the transmission rate in response to receiving the "+1" commands transmitted by the serving BS at times t=3 or 4, but the MS is permitted to increase the transmission rate in response to receiving the "+1" command transmitted by the serving BS at time t=5 because the second hysteresis period $T_b$ expires after that command.

Alternatively, the MS may not resume obeying "+1" commands transmitted by the serving BS until such a command is received whilst no hysteresis period is in progress.

In some embodiments of the invention, any rate change at the end of the hysteresis period, either when the predetermined time period expires or when it is terminated by the non-serving BSs, may be of a magnitude different from the most recent "rate increase" command received from the serving BS; for example, the rate change may be the sum of the rate change commands received from one or more BSs during the hysteresis period.

The up or down commands may be single bits, or may take a range of different values signifying for example the magnitude of the desired transmission rate change. The representation of commands transmitted by the serving and non-serving base stations need not be identical.

Figure 4:
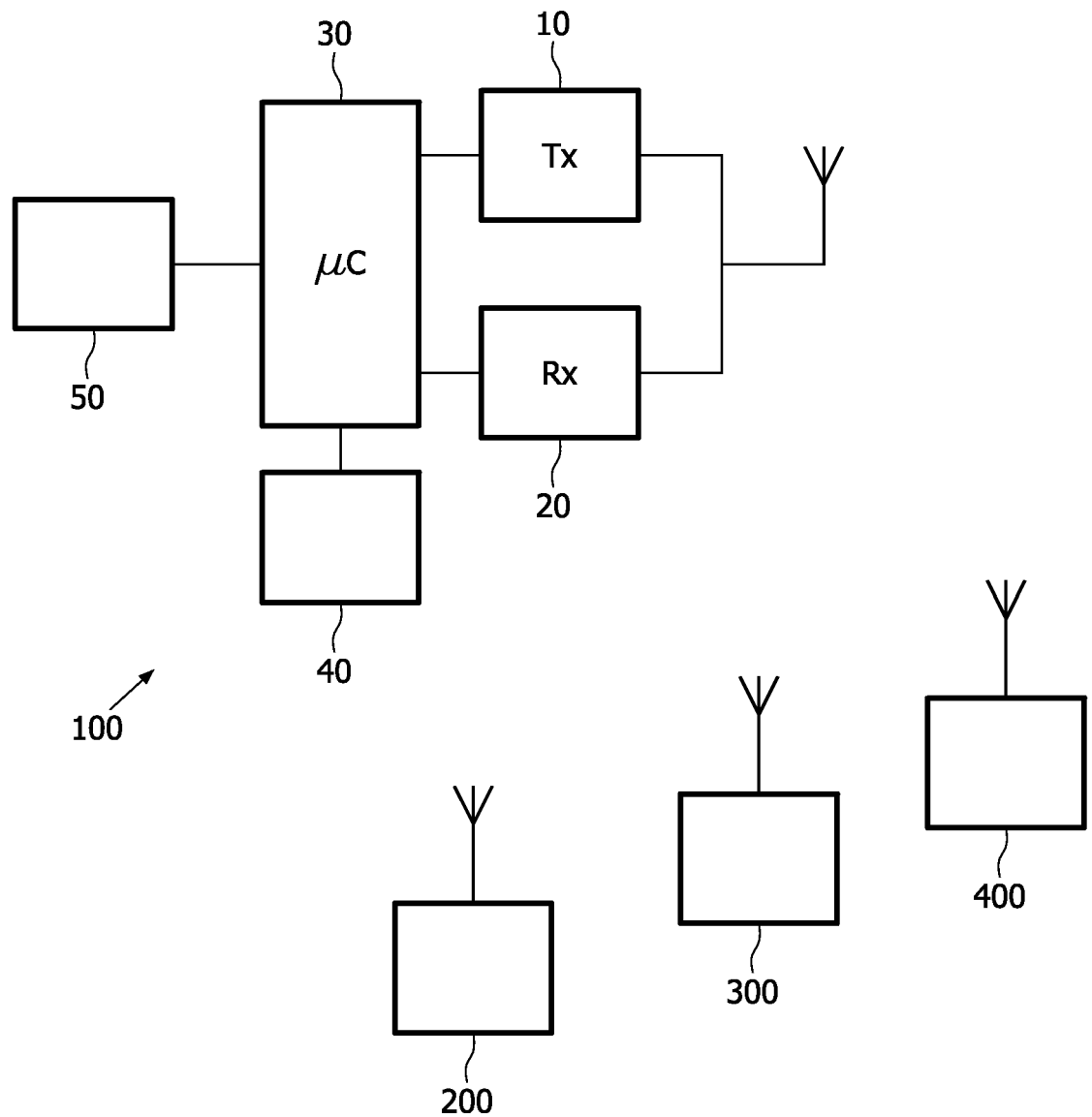
FIG. 4 is a block schematic diagram of a communication system.

FIG. 4 illustrates a block schematic diagram of a communication system comprising a first communication device 100, for example an MS, and three communication stations 200, 300 and 400, for example BSs, of which one (300) is a serving station and the other two (200, 400) are non-serving stations. The communication device 100 comprises a transmitter (Tx) 10 and receiver (Rx) 20 for communication with the communication stations 200, 300, 400, a processing means 30, such as a processor, coupled to the transmitter 10 and receiver 20 for generating signals for transmission and for processing received commands, adjustment means 40 coupled to the processing means 30 for adjusting, in response to received commands and in accordance with the method described, a parameter value, such as transmission rate, of signals generated by the processing means 30, and a timing means 50 coupled to the processing means 30 for timing the one or more predetermined time periods. Although the examples of FIGS. 2 and 3 have been described by reference to two predetermined hysteresis periods $T_b$ and $T_c$, the timing may be implemented using a single timer that is restarted at the commencement of each predetermined time period.

Either or both of the adjustment means 40 and the timing means 50 may be implemented in a general purpose computer or using customised circuitry.

Figure 5:
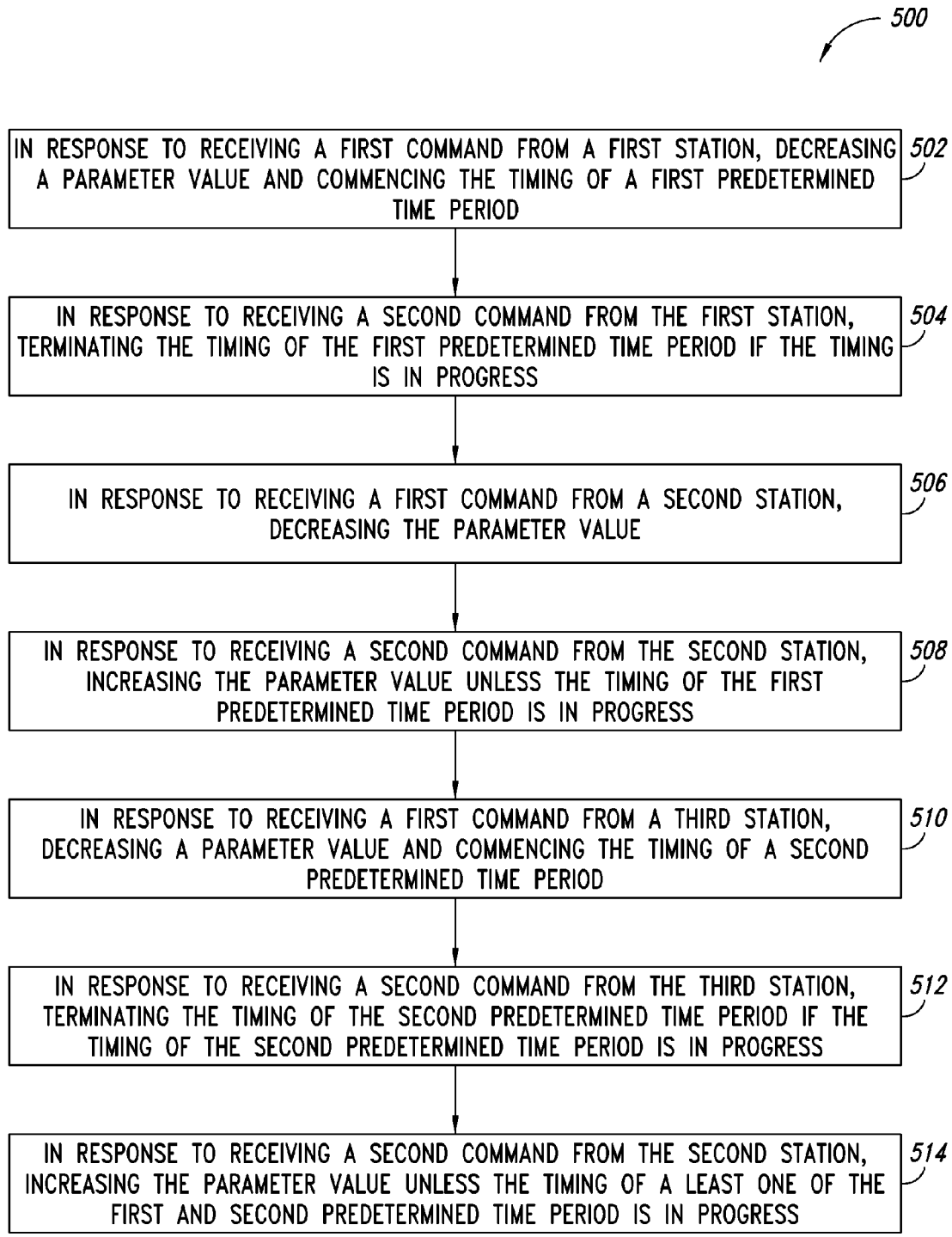
FIG. 5 illustrates an embodiment of a method.

FIG. 5 illustrates an embodiment of a method 500 of operating a first communication device in a communication system comprising a plurality of stations. At act 502, in response to receiving a first command from a first station, the first communication device decreases a parameter value and commence the timing of a first predetermined time period. At act 504, in response to receiving a second command from the first station, the first communication device terminates the timing of the first predetermined time period if the timing is in progress. At act 506, in response to receiving a first command from a second station, the first communication device decreases the parameter value. At act 508, in response to receiving a second command from the second station, the first communication device increases the parameter value unless the timing of the first predetermined time period is in progress. At act 510, in response to receiving a first command from a third station, the first communication device decreases a parameter value and commences the timing of a second predetermined time period. At act 512, in response to receiving a second command from the third station, the first communication device terminates the timing of the second predetermined time period if the timing of the second predetermined time period is in progress. At act 514, in response to receiving the second command from the second station, the first communication device increases the parameter value unless the timing of at least one of the first and second predetermined time period is in progress.

Although the invention has been described with reference to commands for adjusting the transmission rate, the invention is also applicable to the adjustment of other parameters, such as transmit power, modulation scheme, number of transmitted carrier frequencies, number of transmitted timeslots, number of transmitted spreading codes, spreading factor or code rate (e.g. the ratio of information bits to redundancy bits).

In the claims, the first and third stations may be non-serving stations and the second station may be a serving station.

Although the invention has been described with reference to UMTS, it is applicable to other types of mobile communication system and devices.

In the present specification and claims the word "a" or "an" preceding an element does not exclude the presence of a plurality of such elements. Further, the word "comprising" does not exclude the presence of other elements or steps than those listed. The inclusion of reference signs in parentheses in the claims is intended to aid understanding and is not intended to be limiting.

From reading the present disclosure, other modifications will be apparent to persons skilled in the art. Such modifications may involve other features which are already known in the art of mobile communications and which may be used instead of or in addition to features already described herein.

The invention claimed is:

1. A method of operating a first communication device in a communication system comprising a plurality of stations, the method being performed using the first communication device and comprising:
   in response to receiving a first command from a first station, decreasing a parameter value and commencing the timing of a first predetermined time period;
   in response to receiving a second command from the first station, terminating the timing of the first predetermined time period if the timing is in progress;
   in response to receiving a first command from a second station, decreasing the parameter value; and
   in response to receiving a second command from the second station, increasing the parameter value unless the timing of the first predetermined time period is in progress.

2. The method as claimed in claim 1, further comprising:
   in response to receiving a first command from a third station, decreasing a parameter value and commencing the timing of a second predetermined time period;
   in response to receiving a second command from the third station, terminating the timing of the second predetermined time period if the timing of the second predetermined time period is in progress; and
   in response to receiving the second command from the second station, increasing the parameter value unless the timing of at least one of the first and second predetermined time period is in progress.

3. The method as claimed in claim 1 wherein the increasing and decreasing of the parameter value is indicative of an adjustment of at least one of: transmission rate; transmit power; modulation scheme; number of transmitted carrier frequencies; number of transmitted time slots; number of transmitted spreading codes;
   spreading factor; and code rate.

4. A communication device comprising: means for receiving commands from a plurality of stations; adjustment means for adjusting a parameter value in response to the receiving commands; and timing means for timing one or more predetermined time periods; wherein
   in response to the receipt of a first command from a first station, the adjustment means is configured to decrease the parameter value and the timing means is configured to commence the timing of a first predetermined time period;
   in response to the receipt of a second command from the first station, the timing means is configured to terminate the timing of the first predetermined time period;
   in response to the receipt of a first command from a second station, the adjustment means is configured to decrease the parameter value; and
   in response to the receipt of a second command from the second station, the adjustment means is configured to increase the parameter value unless the timing of the first predetermined time period by the timing means is in progress.

5. The communication device as claimed in claim 4 wherein
   in response to the receipt of a first command from a third station, the adjustment means is configured to decrease the parameter value and the timing means is configured to commence the timing of a second predetermined time period;
   in response to the receipt of a second command from the third station, the timing means is configured to terminate the timing of the second predetermined time period; and
   in response to the receipt of the second command from the second station, the adjustment means is configured to increase the parameter value unless the timing of at least one of the first and second predetermined time periods by the timing means is in progress.

6. The communication device as claimed in claim 4 wherein the increase and decrease of the parameter value is indicative of an adjustment of at least one of: transmission rate; transmit power; modulation scheme; number of transmitted carrier frequencies; number of transmitted time slots; number of transmitted spreading codes; spreading factor; and code rate.

7. A communication system comprising:
a communication device having: means for receiving commands from a plurality of stations; adjustment means for adjusting a parameter value in response to the receiving commands; and timing means for timing one or more predetermined time periods; wherein
in response to the receipt of a first command from a first station, the adjustment means is configured to decrease the parameter value and the timing means is configured to commence the timing of a first predetermined time period;
in response to the receipt of a second command from the first station, the timing means is configured to terminate the timing of the first predetermined time period;
in response to the receipt of a first command from a second station, the adjustment means is configured to decrease the parameter value; and
in response to the receipt of a second command from the second station, the adjustment means is configured to increase the parameter value unless the timing of the first predetermined time period by the timing means is in progress; and
a plurality of stations for communicating with the communication device.

8. The communication system of claim 7 wherein
in response to the receipt of a first command from a third station, the adjustment means is configured to decrease the parameter value and the timing means is configured to commence the timing of a second predetermined time period;
in response to the receipt of a second command from the third station, the timing means is configured to terminate the timing of the second predetermined time period; and
in response to the receipt of the second command from the second station, the adjustment means is configured to increase the parameter value unless the timing of at least one of the first and second predetermined time periods by the timing means is in progress.

9. The communication system of claim 7 wherein the increase and decrease of the parameter value is indicative of an adjustment of at least one of: transmission rate; transmit power; modulation scheme; number of transmitted carrier frequencies; number of transmitted time slots; number of transmitted spreading codes; spreading factor; and code rate.

* * * * *